April 11, 1950 V. H. BORGELT 2,503,577
SCOOP RESET MECHANISM
Filed Dec. 26, 1947

Inventor
Victor H. Borgelt
By Arthur H. Sturges.
Attorney

Patented Apr. 11, 1950

2,503,577

UNITED STATES PATENT OFFICE 2,503,577

SCOOP RESET MECHANISM

Victor H. Borgelt, Wisner, Nebr.

Application December 26, 1947, Serial No. 794,046

3 Claims. (Cl. 214—140)

This invention relates to material moving devices and more particularly it is an object of the invention to provide a scoop reset mechanism or scoop tilting device therefor.

In the operation of material moving devices the scoops of the latter are first disposed in a down position for scooping up material at a time when the latter is laying on the ground. The scoop is then elevated to an up position and the material moving mechanism is driven to a desired dumping point, the operator then manipulates a lever or other control apparatus for dumping the scoop. In repeating this operation the scoop is again lowered to the ground and such lever or control apparatus is again manipulated by the operator for locking the scoop in a shoveling position.

Throughout these operations the driver is busy with one of his hands on the steering apparatus of the material moving mechanism and the other of his hands is usually fully occupied with the shifting of the gears in the propelling mechanism of the material mover as well as being occupied with the control employed for raising and lowering the scoop and scoop-supporting booms. As a result it is desirable to have means for automatically tilting the scoop simultaneous with elevating the same to an up position and for automatically shifting the scoop into a shoveling position at times when the booms are disposed in a lower position for the scooping of material.

It is an object of this invention to provide such automatic means.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
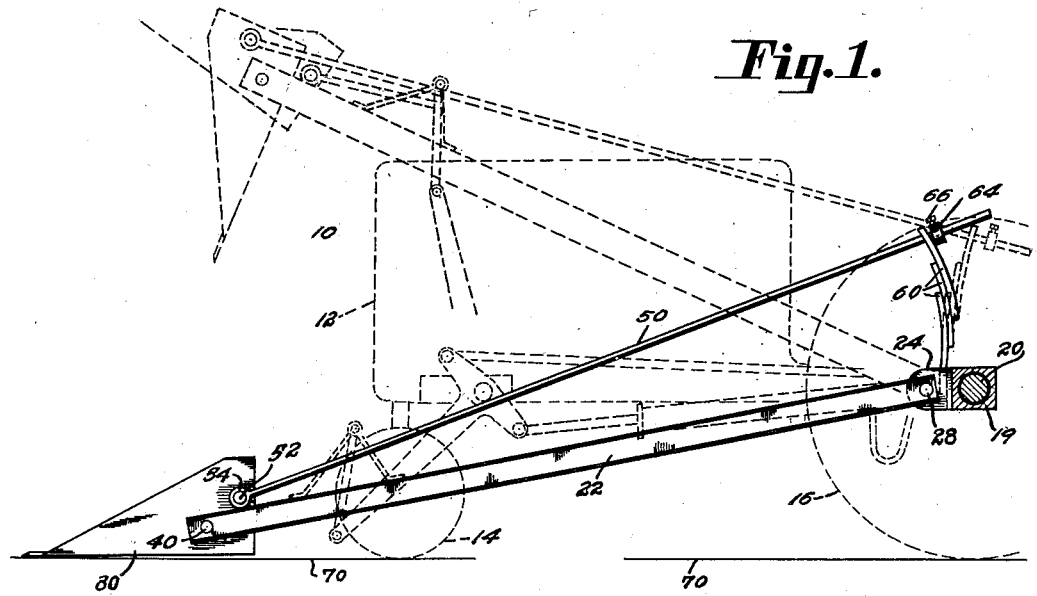
Figure 1 is a side elevation of the scoop shoveling device of the invention shown as applied to the material lifting apparatus of a tractor, the tractor and boom raising apparatus thereof and being shown in dotted lines.
Figure 2:
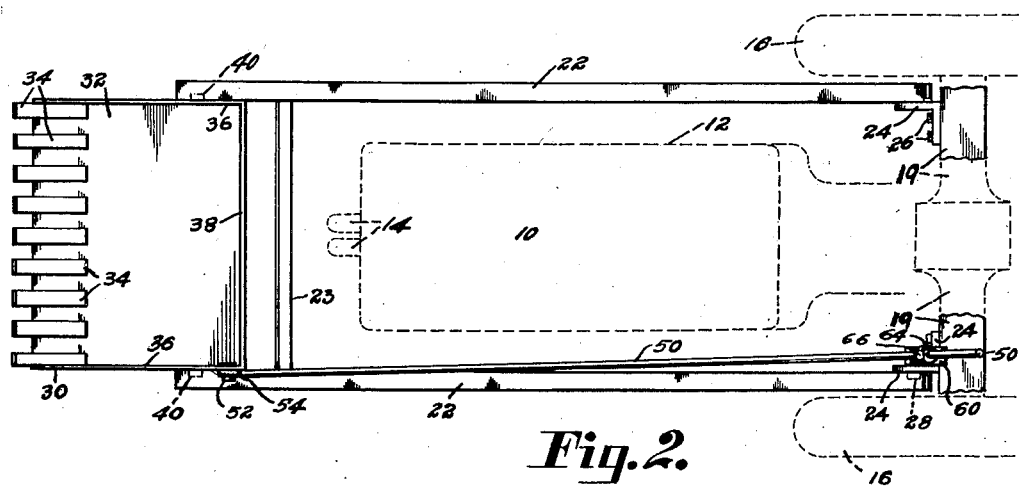
Figure 2 is a top plan view of the devices as shown in Figure 1.
Figure 3:
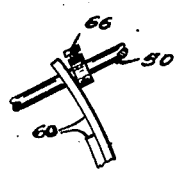
Figure 3 is a detailed side elevation of an end of a spring and rod employed and the slidable connection therebetween.
Figure 4:
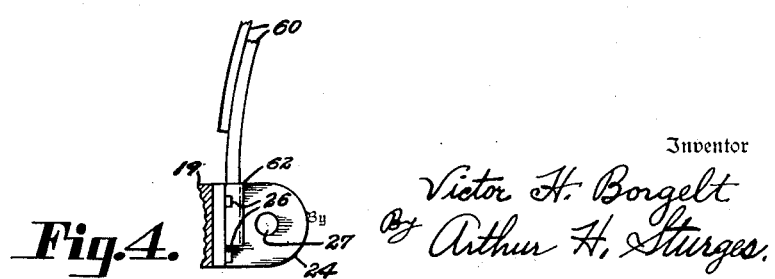
Figure 4 is a detailed view showing the connection between a leaf spring employed and the rear axle housing of a tractor, an ear for pivotally supporting a boom also being shown.

The scoop tilting device of this invention is for attachment to a material moving device such as is shown in dotted lines in Figures 1 and 2 and generally indicated at 10.

A most common form of such machine includes a tractor 12, having front and rear wheels 14 and 16, a rear axle housing 19, and a rear axle 20. A pair of elongated booms 22 are disposed longitudinally along either side of the tractor 12. The booms 22 are interconnected at their forward ends by a brace 23 and are pivotally secured to the rear axle housing 19 by a pair of right-angle shaped brackets 24 which latter are each provided with a portion extending inwardly from their respective booms in parallelism with the rear axle housing 19. This portion is secured to the rear axle housing 19 by means of suitable bolts 26.

Another portion of each of the right-angle shaped brackets 24 extends forwardly and longitudinally of the tractor and in parallelism with the booms 22, being pivotally secured to the booms 22 by means of pins 28 disposed in apertures 27.

The booms 22 are preferably formed of channel iron as shown. They are raised and lowered by hydraulic mechanism generally indicated by the numeral 29, only partially shown in dotted lines in Figure 1 and controllable by the driver of the tractor 10.

At the forward end of the booms 22 and medially disposed between the latter a scoop 30 is provided. The scoop 30 has a bottom 32 having sharpened digging teeth 34 attached to the transversely disposed forward end thereof.

The scoop 30 is further provided with a pair of vertically disposed sides 36 extending longitudinally of the tractor 12, and a back wall 38 extending transversely of the tractor 12 and secured to the sides 36.

The sides 36 of the scoop 30 are each pivotally secured by means of one of a pair of bolts 40 to the forward end of a different one of the booms 22.

The bolts 40 are connected to the sides 36 in such positions that the scoop 30, when fully loaded, will become over-balanced and so that, if not restrained, it will automatically tip forwardly. In other words, the center of gravity of the scoop 30, when fully loaded, will be disposed forwardly of the pivotal connections between the scoop 30 and the booms 22.

All parts thus described are old and conventional in material moving mechanisms. The scoop tilting device of this invention will now be described.

Such scoop tilting device includes an elongated rigid member or rod 50 pivotally secured to the scoop 30 at a point disposed at one side of and preferably above the boom 22. This pivotal connection is formed by a pin 52, attaching an eyelet 54, in the forward end of the rod 50, to the outside on one of the sides 36 of the scoop 30.

The rod 50 extends rearwardly in substantial alignment with the boom 22 as seen in top plan view and is disposed at its other or rearward end and during operation in at least one position on the same side of the boom 22 that the pivot pin 52 is disposed.

At its rearward end the rod 50 is slideably disposed in an aperture in the upper end of a resilient member or leaf-spring 60. The spring 60 extends in a generally vertical direction upwardly from the rear axle housing 19 of the tractor and is rigidly secured in a holder 62 which in turn is welded or otherwise suitably secured to that portion of one of the ears which is secured to the rear axle housing 19 by means of bolts 26.

The said bracket 24 is that bracket which is disposed on the same side of the tractor 12 as the rod 50. At its rearward end the rod 50 is provided with a collar 64 secured thereto by means of a bolt 66. The collar 64 is disposed on the rearward side of the leaf-spring 60 from the pivot pin 52. The leaf-spring 60 is composed of a plurality of over-lapping inter-connected leaves disposed curving rearwardly at their upper end when at rest.

In operation, in order to scoop material, the booms 22 are lowered into the position shown in Figure 1 for disposing the scoop 30 near the ground 70. The tractor 12 is then driven forwardly for urging the scoop 30 into the pile of material to be moved.

It will be seen that during the urging of the scoop 30 into a pile of material the scoop will be maintained in the position shown in Figure 1 by the strain of the spring 60 on the rod 50. In order to accomplish this the collar 64 is so disposed on the rod 50 that when the scoop is in the lower position shown in full lines in Figure 1, the spring 60 will be bent forwardly into the strained position shown in full lines in Figure 1. The spring 60 will then prevent the forward end of the scoop from tripping on the ground and will prevent the rearward end of the scoop from rising, thus preventing a counter-clockwise rotation of the scoop 30, as it is viewed in Figure 1.

Clockwise rotation of the scoop 30 will be effectively prevented by the engagement of the eye 54 of the rod 50 with the upper side of the adjacent boom 22. Detents may also be placed on the sides 36 of the scoop 30, if desired, for engagement with the booms 22 for preventing clockwise rotation of the scoop 30.

When the scoop is full, the operator will then raise the booms 22 into the position shown in dotted lines in Figure 1. The scoop 30 is then dumped, as illustrated by the dotted line positions in Figure 1, by the release of a conventional latch mechanism, not shown.

Such dumping will result from the center of gravity of the loaded scoop being forwardly of the pivot bolts 40. If desired, in place of the spring 60 and its slideable connection with the rod 50, the rearward end of the rod 50 may be fixed in a permanent position and pivotally secured to a rigid support, the latter in turn being fastened to the rear axle housing 20 of the tractor. If this latter arrangement were employed, the scoop 30 would be caused to dump by a forward urge of the rod 50 against the scoop 30 at the pins 52 regardless of the relative positions of the center of gravity of the scoop 36 and the position of the pivotal connections provided by the pivot bolts 40.

The employment of the spring 60 is preferable however, since the spring 60 tends to maintain the scoop upright at a time when the scoop is raised from the ground for traveling movements —when the scoop is not in an extreme up position shown in dotted lines in Figure 1 for dumping, but in an intermediate position.

When it is desired to lower the scoop for shoveling, it will be seen that as the booms are lowered for this purpose the scoop 30 will automatically return to the upright position under the influence of the spring 60 and rod 50 and without the necessity of any action on the part of the operator.

It will be seen that it is possible for the rod 50 to be placed on the under side of the boom 22. In such case the pivot pin 52 should be disposed forwardly of the pivot bolt 40 and the rearward end of the rod 50 must be maintained on the under side of the booms 22. Such construction is not preferred however, because less clearance is then maintained between the surface 70 of the ground and the lowermost parts of the rod 50.

It will be seen that this invention has provided means for automatically tilting the scoop of the material moving mechanism into shoveling and dumping position at desired times and without the necessity of independent actions by the operator for this purpose.

From the foregoing description, it is thought to be obvious that a scoop tilting device constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. In a material moving device having a boom pivotally attached thereto at one end of said boom and a scoop pivotally secured to the other end of said boom in a manner tending to cause dumping at a time when said scoop is fully loaded: means for automatically tilting said scoop at desired times comprising an elongated member pivotally secured to said scoop at a point disposed at one side of said boom, the other end of said elongated member being disposed during operation in at least one position at said one side of said boom and generally toward said pivotal attachment between said boom and said device from the pivotal attachment between said boom and said scoop; an elongated resilient member being disposed transversely with respect to said elongated member adjacent said other end of said elongated member, one end of said resilient member being rigidly secured to said device, the other end of said resilient member being provided with an aperture therethrough for slideably receiving said elongated member; and means for limiting slideable movement of said elongated member with respect to said resilient member only at times when said boom is in a down position, said point being disposed spaced apart away from said one side of said boom from a line between said at least one position and said pivotal connection between said boom and said scoop, said point being further disposed generally toward said at least one position from the pivotal connection between said boom and said scoop.

2. In a material moving device having at least one pivotally mounted elongated boom having a freely swinging forward end and a scoop pivotally secured to said forward end: a resilient elongated member having a free end; means securing the other end of said member to said device, the free end of said member having an aperture therethrough; a rigid member pivotally secured to said scoop and slidably received through the walls of said aperture; means on said elongated member on the other side of said resilient member from said scoop for engaging the latter, the construction being such that at times when said boom is in a shoveling position said resilient member pulls rearwardly on said scoop and when said boom is in a dumping position said rigid member is free to permit said scoop to dump.

3. In a material moving device having at least one pivotally mounted elongated boom having a freely swinging forward end and a scoop pivotally secured to said forward end: an elongated rigid member pivotally secured to said scoop at one end and disposed inclinedly with respect to and alongside said boom; resilient means mounted on said device, said resilient means being correlated with said rigid member in such a manner that at times when said boom is in a shoveling position said resilient member pulls rearwardly on said scoop and when said boom is in a dumping position said rigid member is free to permit said boom to dump.

VICTOR H. BORGELT.

REFERENCES CITED

The following references are of record in the file of this patent:

UNITED STATES PATENTS

| Number | Name | Date |
|---|---|---|
| 1,527,251 | Furst | Feb. 24, 1925 |
| 1,733,969 | Knapp, Jr. | Oct. 29, 1929 |
| 2,357,954 | Johnson | Sept. 12, 1944 |
| 2,457,049 | Lacey | Dec. 21, 1948 |